US010696559B2

(12) United States Patent
Nicolas et al.

(10) Patent No.: US 10,696,559 B2
(45) Date of Patent: *Jun. 30, 2020

(54) HIERARCHICALLY POROUS ZEOLITES

(71) Applicant: ARKEMA FRANCE, Colombes (FR)

(72) Inventors: Serge Nicolas, Lons (FR); Ludivine Bouvier, Orthez (FR); Cécile Lutz, Gan (FR)

(73) Assignee: Arkema France, Colombes (FR)

(*) Notice: Subject to any disclaimer, the term of this patent is extended or adjusted under 35 U.S.C. 154(b) by 0 days.

This patent is subject to a terminal disclaimer.

(21) Appl. No.: 16/056,762

(22) Filed: Aug. 7, 2018

(65) Prior Publication Data

US 2018/0362355 A1    Dec. 20, 2018

Related U.S. Application Data

(63) Continuation of application No. 14/892,101, filed as application No. PCT/FR2014/052054 on Aug. 6, 2014, now Pat. No. 10,071,914.

(30) Foreign Application Priority Data

Sep. 2, 2013    (FR) ..................... 13 58357

(51) Int. Cl.
    *B32B 5/16*    (2006.01)
    *C01B 39/24*   (2006.01)
    *C01B 39/04*   (2006.01)

(52) U.S. Cl.
    CPC ............. *C01B 39/24* (2013.01); *C01B 39/04* (2013.01); *C01P 2002/22* (2013.01);
    (Continued)

(58) Field of Classification Search
    CPC ..... C01B 39/04; C01B 39/24; C01P 2006/12; C01P 2006/14; C01P 2006/17
    See application file for complete search history.

(56) References Cited

U.S. PATENT DOCUMENTS 3,639,099 A  *  2/1972  Elliott, Jr. ........... C01B 33/2853
                                                    423/709
3,947,482 A     3/1976  Albers
                        (Continued)

FOREIGN PATENT DOCUMENTS

CN    103214003    7/2013
EP    0364352      4/1990
                  (Continued)

OTHER PUBLICATIONS

Verboekend et al., Hierarchical Y and USY zeolites designed by post-synthetic strategies,, Research Collection published Mar. 7, 2012 (Year: 2012).*

(Continued)

*Primary Examiner* — Hoa (Holly) Le
(74) *Attorney, Agent, or Firm* — RatnerPrestia

(57) ABSTRACT

The present invention concerns Y-type FAU zeolites with hierarchical porosity having an Si/Al atomic ratio strictly greater than 1.4 and less than or equal to 6, having controlled and optimised crystallinity, and having mesoporosity such that the mesoporous outer surface area is between 40 $m^2 \cdot g^{-1}$ and 400 $m^2 \cdot g^{-1}$. The present invention also concerns the method for preparing said Y-type FAU zeolites with hierarchical porosity.

10 Claims, 2 Drawing Sheets

(52) U.S. Cl.
CPC ...... *C01P 2006/12* (2013.01); *C01P 2006/14* (2013.01); *C01P 2006/17* (2013.01)

(56) References Cited

U.S. PATENT DOCUMENTS

| | | | |
|---|---|---|---|
| H282 H | 6/1987 | Edwards et al. | |
| 5,098,686 A | 3/1992 | Delprato | |
| 5,928,623 A | 7/1999 | Plee | |
| 6,284,218 B1 | 9/2001 | Kuvettu et al. | |
| 6,436,364 B1 | 8/2002 | Chiyoda et al. | |
| 7,968,079 B2 | 6/2011 | Sarkar et al. | |
| 8,486,369 B2 | 7/2013 | Garcia-Martinez | |
| 10,071,914 B2* | 9/2018 | Nicolas | C01B 39/24 |
| 10,118,152 B2* | 11/2018 | Bouvier | C01B 39/026 |
| 2009/0156389 A1 | 6/2009 | Ryoo et al. | |
| 2012/0027673 A1 | 2/2012 | Larsen et al. | |
| 2013/0183229 A1 | 7/2013 | Garcia-Martinez | |
| 2013/0183231 A1 | 7/2013 | Senderov | |
| 2016/0137517 A1 | 5/2016 | Nicolas et al. | |
| 2016/0207024 A1* | 7/2016 | Bouvier | C01B 39/026 |

FOREIGN PATENT DOCUMENTS

| | | |
|---|---|---|
| EP | 0818418 | 1/1998 |
| EP | 2592049 | 5/2013 |
| JP | 61037206 B | 8/1986 |
| WO | 2007043731 | 4/2007 |
| WO | 2012084276 | 6/2012 |
| WO | 2013106816 | 7/2013 |

OTHER PUBLICATIONS

Koekkoek et al., Catalysis Today, 168:96-111 (2011).

Cho, K., et al., "Generation of mesoporosity in LTA zeolites by organosilane surfactant for rapid molecular transport in catalytic application," Nov. 4, 2009, pp. 5664-5673, vol. 21(23), Chemistry of Materials.

Inayat, A., et al., "Assemblies of mesoporous FAU-type zeolite nanosheets," Feb. 20, 2012, pp. 1962-1965, vol. 51(8), Angewandte Chemie International Edition.

International Search Report for International Application No. PCT/FR2014/052054 dated Feb. 12, 2015.

Jacobsen, C.J.H., et al., "Mesoporous zeolite single crystals," Jul. 6, 2000, pp. 7116-7117, vol. 122(29), Journal of American Chemical Society.

Liu, B., "Synthesis and structural properties of hierarchically structured aluminosilicates with zeolite Y (FAU) frameworks," Jun. 14, 2013, pp. 15075-15084, vol. 3(35), RSC Advances.

Matsukata, M., et al., "Conversion of dry gel to microporous crystals in gas phase," 1999, pp. 77-92, vol. 9(1-2), Topics in Catalysis.

Meng, Y., et al., "Synthesis conditions of mesoporous NaA zeolites," Jul. 2013 pp. 4423-4426, vol. 25(8), Asian Journal of Chemistry.

Choi, M., et al., "Amphiphilic organosilane-directed synthesis of crystalline zeolite with tunable mesoporosity," Aug. 6, 2006, pp. 718-723, vol. 5, Nature Materials.

Schwieger, W., et al., "Assemblies of mesoporous FAU-type zeolite nanosheets," Feb. 20, 2012, pp. 1962-1965, vol. 51(8), Angewandte Chemie International Edition.

Serrano, D., et al., "Synthesis strategies in the search for hierarchical zeolites," May 7, 2013, pp. 4004-4035, vol. 42(9), Chemical Society Reviews.

Verboekend, D., et al., "Hierarchical Y and USY zeolites designed by post-synthetic strategies," Mar. 7, 2012, pp. 916-928, vol. 22(5), Advanced Functional Materials.

Breck, D,W., Zeolite Molecular Sieves, John Wiley and Sons, New York, 1973, table 4.26, p. 348.

Perez-Ramirez, J., et al., "Hierarchically structured zeolite bodies: assembling micro-, meso-, and macroporosity levels in complex materials with enhanced properties," 2012, pp. 2509-2518, vol. 22 (12), Advanced Functional Materials.

Written Opinion of the International Searching Authority for International Application No. PCT/FR2014/052054 dated Feb. 12, 2015.

* cited by examiner

HIERARCHICALLY POROUS ZEOLITES

CROSS-REFERENCE TO RELATED APPLICATIONS

This application is a continuation of U.S. application Ser. No. 14/892,101, filed Nov. 18, 2015, which is the national phase of International Application No. PCT/FR2014/052054, filed Aug. 6, 2014, which claims priority from French Application No. 1358357, filed Sep. 2, 2013. The entire disclosures of each of these applications are incorporated herein by reference for all purposes.

FIELD OF THE INVENTION

The present invention relates to the field of zeolites, more particularly hierarchically porous zeolites, and especially hierarchically porous zeolites (HPZ) having a faujasite (FAU) structure with an Si/Al atomic ratio which is strictly greater than 1.4, in particular Y-type zeolites, referred to hereinafter as HPY.

BACKGROUND OF THE INVENTION

Synthetic (i.e. non-natural) zeolites are of ever-increasing interest in industry, as witnessed especially by the numerous recent research studies relating to the production of ever more efficient zeolites, with increasingly simple synthetic processes that are economic and easy to perform.

In recent years, hierarchically porous zeolites (HPZ) have been the subject of numerous scientific publications and patent applications. Thus, as early as 2005, the process for synthesizing hierarchically porous zeolites with good crystallinity (pure phase, observed by XRD) was described in patent application WO 2007/043 731, using a structuring agent of organosilane type.

The product obtained after calcination comprises a zeolite network linked to a network of mesopores a few nanometres in diameter. The hydrothermal resistance of this product is much better than that of mesoporous solids of MCM-41 type, which makes it possible to envisage applications in which thermal regeneration takes place.

Other methods for preparing hierarchically porous zeolites, i.e. solids comprising a microporous network of zeolite type linked to a network of mesopores, have been developed and may be classified in the following manner (review by D. P. Serrano, *Chem. Soc. Rev.*, (2013), 42, 4004-4035):

Post-treatment of the zeolite structures which consists in removing atoms from the zeolite network to create mesopores; this may be carried out either via acidic treatments which dealuminize the solid, followed by washing with sodium hydroxide which removes the aluminium residues formed (J. Perez-Ramirez et al., *Adv. Funct. Mater.*, (2012), p 1-12) or via treatments that combine the action of an acid and that of a structuring agent which promotes the formation of mesopores (cf. WO 2013/106816).

"Hard templating method" or "moulding method" which consists in using a porous network (organic or inorganic) as a mould; this porous network is placed in contact with a reaction medium that can form a zeolite network via hydrothermal transformation, crystallization of the zeolite is performed and the mould is then removed either by calcination or by dissolution to generate the mesoporosity (C. J. H. Jacobsen, *J. Am. Chem. Soc.*, (2000), 122, 7116-7117).

Zeolitization of amorphous mesoporous solids such as mesoporous silicas formed according to the sol-gel technique described by M. Matsukata et al., (*Top. Catal.*, (1999), 9, 77-92).

Direct synthesis mentioned at the start using a structuring agent of the organosilane type, this type of structuring agent having the particular feature of having, on the one hand, affinity with the silico-alumina species which form the zeolite network by virtue of its silane function, and, on the other hand, of being able to occupy a space with its long-chain organic function which serves to occupy the space and to create mesoporosity when it is removed (patent application WO 2007/043 731).

However, even though the solids obtained according to this direct synthetic process do indeed have hierarchical porosity as shown by the nitrogen adsorption isotherms and the transmission microscopy photos (*Angew. Chem. Int. Ed.*, (2012), 51, 1962-1965), it is observed that:

the micropore volume of these hierarchically porous zeolites is significantly lower than that of non-mesoporous zeolites, the structuring agent modifies the growth rates of the crystal faces, which does not allow the size of the crystals to be correctly controlled, the increase in content of structuring agent directed towards increasing the mesopore volume leads to a loss of selectivity for the crystallization of a given zeolite, which results in the formation of an unwanted mixture of zeolite structures (Y. Meng et al., *Asian Journal of Chemistry*, 25 (8), (2013), 4423-4426).

One of the objects of the present invention is to solve at least these three major drawbacks noted for direct synthesis using a structuring agent of organosilane type.

Mention may also be made of the following documents, in which the use of structuring agents of organosilane type, and of organosilane derivatives, is described, for the purpose of synthesizing various hierarchically porous zeolite structures including zeolites X and LTA.

Thus, R. Ryoo (*Nature Materials*, (2006), vol. 5, p. 718 sqq.) describes the synthesis of LTA having mesoporosity and, later, (K. Cho et al., *Chem. Mater.*, 21, (2009), 5664-5673) the synthesis of mesoporous zeolites of LTA type and applications thereof in catalysis. The diffractograms presented in FIG. 2 of the article by K. Cho (see above) show that there is no contaminating crystalline phase. On the other hand, the decrease in intensity of the peaks, when there is addition of structuring agent and a fortiori when its amount increases, proves a degradation of the crystalline framework (low microporosity).

Patent application EP2592049 proposes the synthesis of a zeolite having very substantial and well-organized mesoporosity, but with a marked degradation of the crystalline framework (very low microporosity). This process uses a specific structuring agent comprising three ammonium functions.

The studies by W. Schwieger (*Angew. Chem., Int. Ed.*, (2012), 51, 1962-1965) concern the synthesis of mesoporous zeolite of FAU (X) type using a structuring agent. A single example presents the use of TPHAC ([3-(trimethoxysilyl)propyl]hexadecyldimethylammonium chloride) as structuring agent, with a TPHAC/$Al_2O_3$ mole ratio equal to 0.06.

The article by Y. Meng (*Asian Journal of Chemistry*, 25 (8), (2013), 4423-4426) describes syntheses of mesoporous zeolite LTA using [3-(trimethoxysilyl)propyl]octadecyldimethylammonium chloride (TPOAC), as structuring agent, and presents a study of various synthetic parameters including the amount of structuring agent used, the alkalinity of the reaction medium and the crystallization temperature.

It emerges that an increase in the content of structuring agent which should lead to an increase in the mesopore volume also has the effect of modifying the growth rates of the zeolite network, thus resulting in the appearance of other zeolite crystalline phases and thus the formation of mixtures of zeolite structures, which is not desired. Moreover, the diffractograms of FIG. 1 of the said article show a lowering of the crystallinity.

The abovementioned prior art moreover shows that the micropore volumes are markedly lower than the micropore volumes of equivalent non-mesoporous zeolites (i.e. zeolites whose mesoporous outer surface area as defined below is strictly less than 40 m$^2\cdot$g$^{-1}$), which is very detrimental in applications in which a high content of active sites is required. What is more, the size of the crystals is subject and cannot be modified.

Finally, the preparation processes described in the prior art do not appear to be readily industrializable especially on account of the high costs that they may generate, and on account of the synthesis times, which are proportionately longer the higher the desired mesoporosity.

With regard more particularly to the mesoporous zeolites of Y type, the literature provides some references regarding the syntheses thereof involving post-treatments of zeolites Y.

Thus, for example, the article by U. Lohse et al. (Z. Anorg. Allg. Chem., 476, (1981), 126-135) describes the creation of a system of mesopores having a size close to 20 nm in a zeolite Y by steam treatment then by acid extraction. However, these successive treatments lead to a drastic reduction in the crystallinity of the mesoporous zeolite Y in comparison with the untreated initial zeolite.

In document US 2013/0183229, the post-treatment is carried out by introducing an amount of Pluronic® (non-ionic surfactant) of the same order of magnitude (similar amount by weight) as the amount of zeolite Y, then by long liquid-route treatments, followed by several calcination treatments.

Documents U.S. Pat. No. 8,486,369 and US 2013/0183231 present post-treatments that use a cetyltrimethylammonium (CTA) halide coupled with an acid, then a steam treatment. However, such post-treatments have the major drawbacks of reducing both the crystallinity and the micropore volume of the initial zeolites. They also result in the material yields being drastically reduced. These effects are even more marked when the desired mesopore volume formed is large.

Another example is illustrated by the studies by D. Verboekend et al. (Advanced Functional Materials, 22(5), (2012), 916-928) which present zeolites Y having mesopores obtained by a succession of post-treatments. It is indicated (p. 919, left-hand column, 1st §) that these post-treatments greatly degrade the microporosity. This degradation of microporosity is not however visible in Table 2, due to the fact that the micropore volume is measured by D. Verboekend (ibid.) using the t-plot method that simultaneously measures the volumes of the micropores and of the small mesopores. Measurement of the micropore volume using the Dubinin-Raduskevitch equation only takes into account the micropores with a diameter that is strictly less than 2 nm (cf. "Adsorption by powders and porous solids", F. Rouquerol et al., Academic Press, (1999), chap. 8.2.2, pages 224-225).

Application WO 2012/084276 describes a process for preparing a mesoporous zeolite Y by various basic post-treatments but to the detriment of the microporosity. These treatments furthermore result, as claimed, in an increase of the Si/Al atomic ratio via dealumination.

Although these processes make it possible to prepare hierarchically porous zeolites, as shown by the shape of the nitrogen adsorption isotherms of the solids obtained, it is important to note that these processes use amounts of post-treatment fluids of the same order of magnitude as the initial mass of zeolite with numerous long operations. Furthermore, the mass yield of these processes is less than 60%, which further penalizes their production efficiency. These processes are therefore long, expensive and relatively unproductive.

It therefore appears that these prior art documents that relate to the preparation of mesoporous Y-type zeolites only propose synthesis techniques that comprise at least one post-treatment step.

The studies by Baoyu Liu et al. (RSC Advances, 3, (2013), 15075-15084) teach the synthesis of hierarchically porous zeolites Y prepared with the aid of a sacrificial template. However, these zeolites have micropore volumes that are insufficient with regard to the targeted applications that use the said hierarchically porous zeolites Y.

SUMMARY OF THE INVENTION

Thus, one aim of the present invention consists in providing hierarchically porous Y-type FAU zeolites combining mesoporosity, high micropore volume, optimal purity and adjustable crystal sizes and with an Si/Al atomic ration which is strictly greater than 1.4. Another aim of the present invention consists in providing a process that is economical, simple and readily industrializable for the preparation of the said zeolites.

The inventors have now discovered that it is possible to prepare mesoporous Y-type FAU zeolites directly, i.e. without going through the synthesis of a Y-type FAU zeolite that will then be subjected to one or more necessary post-treatments according to the prior art in order to obtain a certain mesoporosity. The hierarchically porous Y-type FAU zeolites (HPY) according to the invention have characteristics that are quite advantageous and are thus readily industrializable by a direct route.

Thus, and according to a first aspect, the present invention relates to a hierarchically porous zeolite having the following characteristics:
- Si/Al atomic ratio strictly greater than 1.4 and less than 6, preferably between 1.5 and 5, limits inclusive, more preferably between between 1.5 and 3, limits inclusive,
- micropore volume V$\mu$p, in cm$^3\cdot$g$^{-1}$, which satisfies the equation V$\mu$p=V$\mu$pR±15%, where V$\mu$pR represents the micropore volume, in cm$^3\cdot$g$^{-1}$, measured under the same conditions, for a zeolite of the same chemical nature and of the same crystalline structure, but the mesoporous outer surface area of which is strictly less than 40 m$^2\cdot$g$^{-1}$, and
- mesoporosity such that the mesoporous outer surface area is between 40 m$^2\cdot$g$^{-1}$ and 400 m$^2\cdot$g$^{-1}$, and preferably between 60 m$^2\cdot$g$^{-1}$ and 200 m$^2\cdot$g$^{-1}$ and more preferably between 60 m$^2\cdot$g$^{-1}$ and 150 m$^2\cdot$g$^{-1}$.

According to a preferred embodiment, the zeolite according to the present invention is a zeolite of FAU type, and especially a zeolite FAU of Y type.

The characteristics mentioned above give the zeolite according to the present invention improved and entirely surprising and advantageous properties, when compared with the solely microporous zeolites or zeolites that are both microporous and mesoporous known in the prior art.

According to one preferred aspect of the present invention, the hierarchically porous zeolite has a numerical mean diameter of the crystals of between 0.1 µm and 20 µm, preferably between 0.1 µm and 10 µm, more preferably between 0.5 µm and 10 µm, and more preferentially between 0.5 µm and 5 µm, limits inclusive.

DETAILED DESCRIPTION OF CERTAIN EMBODIMENTS OF THE INVENTION

Figure 1:
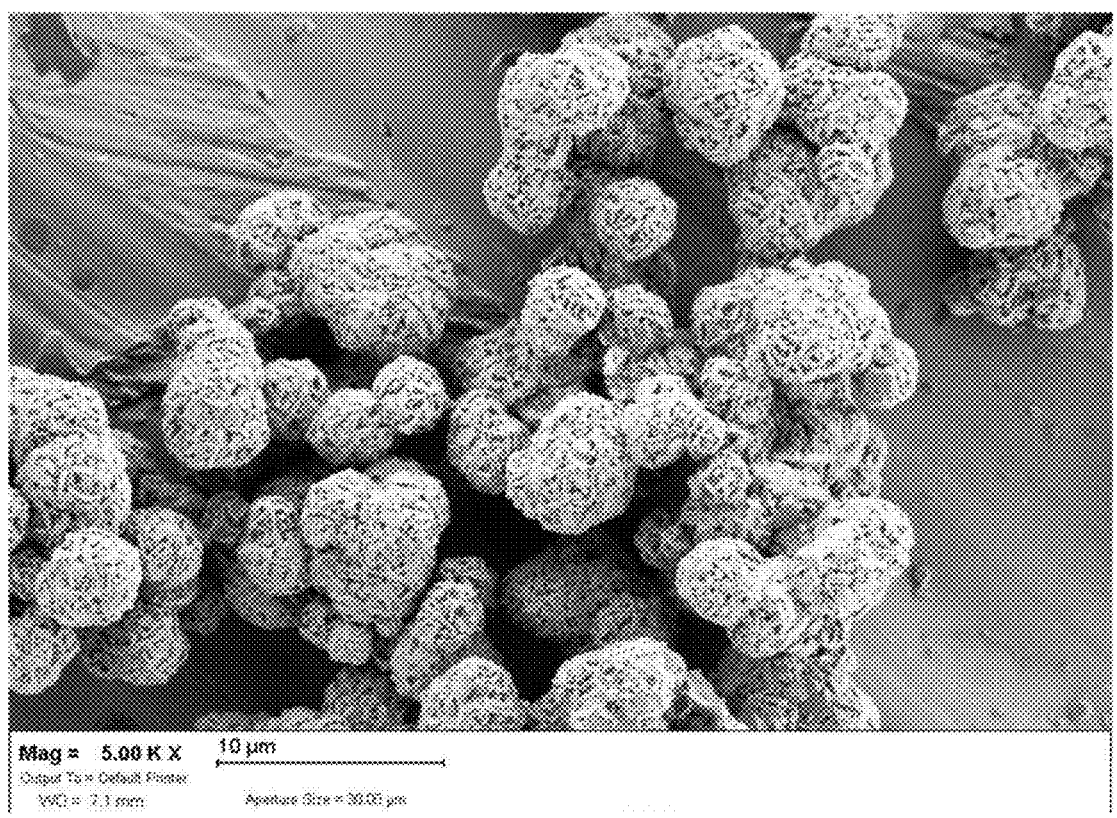
FIGS. 1 and 2 illustrate certain characteristics of the zeolite crystals obtained in Example 4.

The crystal size of the zeolite according to the present invention is expressed via the numerical mean diameter of the crystals by observation using a scanning electron microscope (SEM), as indicated hereinbelow. The present invention also has the advantage of making it possible to adjust and control this crystal size, especially as a function of the synthetic conditions detailed below.

The hierarchically porous zeolite of the present invention additionally has a controlled crystallinity which means that the zeolite comprises a pure zeolite phase, and more specifically consists of a single zeolite phase or comprises, preferably consists of, up to 2% by weight, limit inclusive, of only one or of several other zeolite or amorphous phases, known as contaminating phases (crystallinity determined by XRD, technique described below).

Moreover, the hierarchically porous zeolite according to the invention has an optimal crystallinity, that is to say a micropore volume $V\mu p$ which satisfies the equation $V\mu p = V\mu_{PR} \pm 15\%$, preferably the equation $V\mu p = V\mu_{PR} \pm 10\%$, more preferentially the equation $V\mu p = V\mu_{PR} \pm 5\%$, and most preferably the equation $V\mu p = V\mu_{PR} \pm 3$, where $V\mu_{PR}$ represents the micropore volume measured under the same conditions, for a zeolite of the same chemical nature and of the same crystalline structure, which is perfectly crystalline (according to the base ICDD PDF-2, release 2011) but non-mesoporous within the meaning of the invention, i.e. whose mesoporous outer surface area is strictly less than 40 $m^2 \cdot g^{-1}$.

In the present description, all the micropore volumes are expressed in $cm^3 \cdot g^{-1}$. The expression "zeolite of the same chemical nature and of the same crystalline structure, which is perfectly crystalline but non-mesoporous within the meaning of the invention" is understood to mean a zeolite prepared under the same conditions, but for which no specific treatment has been employed in order to create a mesoporosity, whether this is by a direct route (using a structuring agent as described later on in the present invention) and/or by post-treatment.

By way of example, mention may be made of *Zeolite Molecular Sieves* by D. W. Breck, John Wiley & Sons, New York, (1973), table 4.26, p. 351, in which the micropore volume $V\mu_{PR}$ of a non-mesoporous zeolite FAU NaY, with an Si/Al atomic ratio of between 1.5 and 3, which is perfectly crystalline, is equal to 0.34 $cm^3 \cdot g^{-1}$.

The calculations for the micropore volume and for the mesoporous surface area are performed by applying the methods known to those skilled in the art from the nitrogen adsorption isotherm by applying, as indicated later, the Dubinin-Raduskevitch equation, for the micropore volume and the Harkins-Jura t-plot equation for the microporous and mesoporous surface area.

The hierarchically porous zeolites according to the invention make it possible to reconcile the properties of accessibility to the mesoporous zeolite active sites known in the prior art and those of maximum crystallinity and microporosity of "standard" zeolites (without mesoporosity). Thus, the hierarchically porous zeolites of the present invention have unexpected properties and open new perspectives as regards their fields of industrial application.

In addition, the zeolites of the present invention may be subjected to one or more cationic exchanges (for example with alkali metal or alkaline-earth metal salt(s)) as is well known to those skilled in the art and commonly performed on conventional zeolites.

According to another aspect, the present invention relates to the process for preparing the hierarchically porous zeolites as have just been described. The process of the invention especially has the advantages of being performed easily, of being readily transposable to the industrial scale, especially on account of the high synthetic material yields, the robustness of the process and its rapidity.

More precisely, the process for preparing the hierarchically porous zeolite according to the invention comprises at least the following steps:

a) preparation of a "growth" gel for the preparation of a zeolite FAU of Y type, by mixing a source of silica with a source of alumina, at a temperature of between 0° C. and 60° C., b) addition to the growth gel of step a) of at least one nucleating agent, at a temperature of between 0° C. and 60° C., c) addition to the reaction medium of at least one structuring agent, d) crystallization reaction by increasing the temperature, e) filtration and washing of the zeolite crystals obtained, and f) drying and calcination.

The growth gel used in step a) is perfectly known to those skilled in the art and is perfectly defined, for example, in D. W. Breck (Zeolite Molecular Sieves, John Wiley and Sons, New York, (1973), pp. 277 et seq.).

It should be understood that step c) of addition of structuring agent(s) may be performed at the same time as steps a) and/or b) or alternatively before and/or after steps a) and/or b). In all cases, the structuring agent should be present in the reaction medium before the crystallization step d). However, it is preferred to add the structuring agent after step b). In addition, a lag time (resting time, with or without stirring) may be envisaged between steps a), b), c) and d).

The process of the present invention is characterized by the use of the technique of seeding with at least one nucleating agent, which is well known to those skilled in the art, chosen, for example, from a nucleating gel, a crystal, for example a zeolite crystal, a mineral particle of any nature, for example kaolin, meta-kaolin, or another clay, and the like, and also mixtures thereof.

Without wishing to be bound by the theory, it is considered that the nucleating agent promotes the orientation of the synthesis towards the desired zeolite. In addition, and by virtue of the presence of the nucleating agent, it is possible to use a larger amount of structuring agent than that described in the prior art without disrupting or slowing down the crystallization of the zeolite network.

According to a preferred aspect, the nucleating agent is a nucleating gel and, more preferably, the said nucleating gel comprises a homogeneous mixture of a source of silica (for example sodium silicate), a source of alumina (for example alumina trihydrate), a strong mineral base, for instance sodium hydroxide, potassium hydroxide or calcium hydroxide, to mention but the main ones and the ones most commonly used, and water.

According to one preferred aspect, the growth gel comprises a homogeneous mixture of a source of silica (for example sodium silicate or colloidal silica, preferably colloidal silica), a source of alumina (for example alumina trihydrate), a strong mineral base, such as for example sodium, potassium or calcium hydroxide to mention only the main and most commonly used ones, and water.

The homogeneity of the mixture may be obtained according to any process that is well known to those skilled in the art and, for example and in a non-limiting manner, using a paddle stirrer, a mixer, or alternatively using a mixer of Archimedean screw type as described in patent EP 0 818 418. The stirrers with a high rate of shearing, for example of mixer type, are preferred.

By way of non-limiting example, with an Archimedean screw whose rotation is set at 300 rpm, satisfactory homogeneity is obtained between a few minutes and a few tens of minutes, generally between 20 and 30 minutes.

The mixture is generally prepared at temperatures of between 0° C. and 60° C., and preferably between 10° C. and 40° C., and, for practical and economic reasons, the mixture is prepared at room temperature, for example at 25° C. The homogenization period is then less than two hours.

The process of the present invention is also characterized by the addition to the growth gel thus obtained of at least one nucleating agent, and preferably of a nucleating gel according to the concept defined in U.S. Pat. No. 3,947,482. The amount of nucleating gel added may vary within wide proportions but is generally between 0.1% and 20%, preferably between 0.5% and 15% by weight and more preferably between 1% and 10% by weight, limits inclusive, relative to the weight of the growth gel.

When the nucleating agent is a zeolite crystal, it is preferably a zeolite crystal of the same nature as the zeolite that it is desired to synthesize. The size of the crystal may vary within wide proportions, and is, for example, typically between 0.1 μm and 10 μm. According to a preferred embodiment, the zeolite crystal is introduced in the form of an aqueous suspension. The amount of crystals introduced may also vary within wide proportions but this amount of crystals is generally typically between 0.1% and 10% by weight relative to the total weight of growth gel.

As indicated previously, the process of the present invention is a process for the direct synthesis of hierarchically porous zeolite, and not a process in which the hierarchic porosity results from a post-treatment of an already-synthesized zeolite. However, it would not constitute a departure from the context of the invention to perform a subsequent step of post-treatment of the zeolite as synthesized.

Thus, the process of the present invention comprises a step of addition to the mixture [growth gel/nucleating agent] obtained in step b) of at least one structuring agent.

The structuring agents that may be used are of any type known to those skilled in the art and especially those described in patent application WO 2007/043 731. According to a preferred embodiment, the structuring agent is advantageously chosen from organosilanes and more preferentially from [3-(trimethoxysilyl)propyl]octadecyldimethylammonium chloride, [3-(trimethoxysilyl)propyl]hexadecyldimethylammonium chloride, [3-(trimethoxysilyl)propyl]dodecyldimethylammonium chloride, [3-(trimethoxysilyl)propyl]-octylammonium chloride, N-[3-(trimethoxysilyl)propyl]aniline, 3-[2-(2-aminoethylamino)-ethylamino]propyltrimethoxysilane, N-[3-(trimethoxysilyl)propyl]-N'-(4-vinylbenzyl)ethylenediamine, triethoxy-3-(2-imidazolin-1-yl)propylsilane, 1-[3-(trimethoxysilyl)propyl]urea, N-[3-(trimethoxysilyl)propyl]ethylenediamine, [3-(diethylamino)propyl]trimethoxysilane, (3-glycidyloxypropyl)trimethoxysilane, 3-(trimethoxysilyl)propyl methacrylate, [2-(cyclo-hexenyl)ethyl]triethoxysilane, dodecyltriethoxysilane, hexadecyltrimethoxysilane, (3-aminopropyl)trimethoxysilane, (3-mercaptopropyl)trimethoxysilane, (3-chloropropyl)trimethoxysilane, and also mixtures of two or more thereof in all proportions.

Among the structuring agents listed above, [3-(trimethoxysilyl)propyl]octadecyldimethylammonium chloride, or TPOAC, is most particularly preferred.

Use may also be made of structuring agents of higher molar mass, for example PPDAs (polymer poly-diallyldimethylammonium), PVB (polyvinyl butyral) and other oligomeric compounds known in the field for increasing the diameter of mesopores.

The amount of structuring agent(s) may vary within wide proportions and in general it is such that the structuring agent(s)/starting $Al_2O_3$ mole ratio is between 0.005 and 0.20, preferably between 0.01 and 0.15, and more preferably between 0.02 and 0.08, limits inclusive.

The addition of the structuring agent(s) is performed with stirring, for example as indicated previously in step a), and the mixture is then subjected to a maturation step, preferentially with stirring, still at the same temperature, for example at 25° C., for a time ranging from a few minutes to several tens of minutes, typically for one hour, with stirring at 300 rpm.

After this maturation step, the reaction mixture is engaged in the crystallization step d), with continued stirring, but slower, typically between 20 and 100 rpm, for example at 50 rpm, and while increasing the temperature up to a value between 60° C. and 100° C., for example 75° C. The time required for the crystallization is generally between a few hours and several tens of hours, advantageously between 8 hours and 48 hours.

After the crystallization step, the zeolite crystals are extracted from the reaction medium by filtration, and then washed with one or more suitable aqueous and/or organic solvent(s), but preferably aqueous, and finally dried between 50° C. and 150° C., according to the usual techniques known to those skilled in the art.

The mean size of the crystals may especially be controlled by adjusting the content of nucleating agent (nucleating gel, or crystals, for example of zeolite, or the like) relative to the growth gel in step b).

The dried crystals are then subjected to calcination, this step being necessary to release both the microporosity (removal of water) and the mesoporosity (removal of the structuring agent). The calcination performed to remove the structuring agent may be performed according to any calcination method known to those skilled in the art. For example, and in a non-limiting manner, the calcination of the zeolite crystals comprising the structuring agent may be performed under a stream of an oxidizing and/or inert gas, especially with gases such as oxygen, nitrogen, air, a dry and/or decarbonated air, an oxygen-depleted air, which is optionally dry and/or decarbonated, at one or more temperatures above 150° C., typically between 180° C. and 800° C., and preferentially between 200° C. and 650° C., for a few hours, for example between 2 and 6 hours. The nature of the gases, the temperature increase ramps and the successive temperature steady stages and the durations thereof will be adapted as a function of the nature of the structuring agent.

It would not constitute a departure from the context of the invention to perform one or more cationic exchanges (for example with alkali metal or alkaline-earth metal salt(s)), before or after the drying and/or calcination step (step f)), according to the standard cationic exchange techniques.

As indicated previously, the synthetic process of the invention is performed easily and is performed in a relatively short time, and especially in a time reduced by a factor of at least four, relative to the hierarchically porous zeolites (HPZ) synthetic processes known in the prior art, which are very long on account of the inhibiting effect of the organosilane structuring agent for the nucleation and the growth of the microporous zeolite network. It has been discovered, entirely surprisingly, that the inhibiting effect of the structuring agent (for example TPOAC) is compensated for by virtue of the presence of the nucleating agent.

This simplicity and this speed of synthesis do not, however, harm the quality or properties of the zeolites thus obtained. Specifically, by virtue of the process of the invention, it is possible to increase the selectivity of the synthesis towards a pure zeolite structure (with less than 2% by weight of other contaminating crystalline phase(s)) and to be able to maximize the [micropore volume/mesopore surface area] ratio for a given outer surface area, which is not the case with the known processes of the prior art (cf. for example, the studies by Y. Meng (ibid.) from which it emerges that an increase in the content of structuring agent, which should lead to an increase in the mesopore volume, also had the effect of modifying the rates of growth of the zeolite network, thus resulting in the appearance of other zeolite crystal phases and thus the formation of mixtures of zeolite structures, which is not desired).

Specifically, with the processes of the prior art, increasing the micropore volume of the zeolite and maintaining a high phase purity are only obtained by means of very long crystallization times and relatively low temperatures (<80° C.). However, these processes never achieve micropore volumes comparable to those of the invention.

Thus, when compared with the other HPZ preparation processes, for example by post-treatment, the process of the invention is more productive and less expensive, since it is performed in a single step, over a relatively short time (less than one day) with a small amount of structuring agent, and thus globally with a relatively low cost, or at the very least with a limited excess cost when compared with that of a synthesis of non-mesoporous zeolite, and very much lower than the cost induced by processes of HPZ synthesis via post-treatment.

The use of these hierarchically porous zeolites is particularly advantageous in industrial processes such as adsorption, ion exchange, separation, and may also be envisaged in any technical field in which non-mesoporous zeolites are usually used.

The present invention is now illustrated by the examples that follow and which are presented without any intention to limit the various embodiments of the invention.

In the examples that follow, the physical properties of the zeolite crystals are evaluated via the methods known to those skilled in the art, the main ones of which are recalled below.

Loss on Ignition of the Zeolite Crystals

The loss on ignition is determined under an oxidizing atmosphere, by calcination of the sample in air at a temperature of 950° C.±25° C., as described in standard NF EN 196-2 (April 2006). The measurement standard deviation is less than 0.1%.

Micropore Volume (Dubinin-Raduskevitch Volume):

The Dubinin-Raduskevitch volume is determined from the measurement of the isotherm of adsorption of nitrogen, at its liquefaction temperature. Prior to the adsorption, the zeolite adsorbent is degassed at between 300° C. and 450° C. for a time of between 9 hours and 16 hours, under vacuum ($P<6.7\times10^{-4}$ Pa). The measurement of the adsorption isotherms is then performed on a machine of ASAP 2020 type from Micromeritics, taking at least 35 measurement points at P/P0 relative ratio pressures of between 0.002 and 1. The micropore volume is determined according to Dubinin and Raduskevitch from the isotherm obtained, by applying standard ISO 15901-3 (2007). The micropore volume evaluated according to the Dubinin and Raduskevitch equation is expressed in $cm^3$ of liquid adsorbent per gram of zeolite. The measurement uncertainty is $\pm0.003$ $cm^3 \cdot g^{-1}$.

Size and Morphology of the Crystals (SEM)

The estimation of the numerical mean diameter of the zeolite crystals is performed as indicated previously by observation with a scanning electron microscope (SEM).

In order to estimate the size of the zeolite crystals on the samples, a set of images is taken at a magnification of at least 5000. The diameter of at least 200 crystals is then measured using devoted software, for example the Smile View software from the publisher LoGraMi. The accuracy is of the order of 3%.

The morphology of the crystals is qualified from SEM photogrHPAs taken at the magnification suited to the size of the crystals (cf. FIG. 1).

Measurement of the Mesopore Outer Surface Area ($m^2 \cdot g^{-1}$) Via the t-Plot Method:

The t-plot calculation method exploits the data of the adsorption isotherm Q ads=f (P/P0) and makes it possible to calculate the micropore surface area. The mesopore outer surface area may be deduced therefrom by determining the difference with the BET surface area which measures the total pore surface area in $m^2 \cdot g^{-1}$ (BET S=microp. S+mesop·outer S).

To calculate the micropore surface area via the t-plot method, the curve Q ads ($cm^3 \cdot g^{-1}$) is plotted as a function of t=thickness of the layer dependent on the partial pressure P/P0 which would be formed on a reference non-porous solid (t function of log P/P0: Harkins-Jura equation applied (standard ISO 15901-3:2007)):

$$[13.99/(0.034-\log(P/P0))^{\wedge}0.5],$$

in which, in the interval t between 0.35 nm and 0.5 nm, a straight line may be plotted which defines a y-axis at the origin Q adsorbed which makes it possible to calculate the micropore surface area; if the solid is not microporous, the straight line passes through 0.

Observation of the Mesopore Structure by Transmission Electron Microscopy (TEM)

The powder is dispersed in ethanol: 1 minute with ultrasonication. One drop of the solution is placed on a microscope grate. The sample is left to dry under the ambient conditions. The observation is performed with a transmission electron microscope (CM 200 from FEI) at a voltage of 120 kV.

The magnifications obtained of ×300 000 (cf. FIG. 2) make it possible to visualize the presence of the mesopores and to estimate their diameters.

Analysis of the Si/Al Atomic Ratio of the Zeolites by X-Ray Fluorescence

An elemental chemical analysis of the hierarchically porous zeolite may be performed according to various analytical techniques known to those skilled in the art. Among these techniques, mention may be made of the technique of chemical analysis by X-ray fluorescence as described in standard NF EN ISO 12677: 2011 on a wavelength dispersive spectrometer (WDXRF), for example the Tiger S8 machine from the company Bruker.

X-ray fluorescence is a non-destructive spectral technique exploiting the photoluminescence of atoms in the X-ray range, to establish the elemental composition of a sample. The excitation of the atoms, generally with an X-ray beam or by electron bombardment, generates specific radiations after returning to the ground state of the atom. The X-ray fluorescence spectrum has the advantage of being sparingly dependent on the chemical combination of the element, which offers precise determination, both quantitatively and qualitatively. After calibration for each oxide, a measurement uncertainty of less than 0.4% by weight is conventionally obtained.

These elemental chemical analyses make it possible to check the Si/Al atomic ratio of the zeolite, the measurement uncertainty of the Si/Al atomic ratio is ±5%.

Qualitative and Quantitative Analyses by X-Ray Diffraction

This analysis makes it possible to identify the crystal phases present in the analyzed solid since each of the zeolite structures has a unique diffractogram (or diffraction spectrum) defined by the position of the diffraction peaks and by their relative intensities.

The zeolite crystals are spread out and smoothed on a sample holder by simple mechanical compression. The acquisition conditions for the diffraction spectrum performed on the D5000 Brüker machine are as follows:

Cu tube used at 40 kV-30 mA;
slit size (divergent, scattering and analysis)=0.6 mm;
filter: Ni;
rotating sample device: 15 rpm;
measurement range: $3° < 2\theta° < 50$;
increment: 0.02°;
counting time per increment: 2 seconds.

The interpretation of the diffraction spectrum (or diffractogram) obtained is performed with the EVA software with identification of the phases using the base ICDD PDF-2, release 2011, which makes it possible to demonstrate a perfectly crystalline phase.

The quantity of the zeolite X fractions is measured by XRD analysis. This analysis is performed on a Brüker machine, and the quantity of zeolite fractions is then evaluated by means of the TOPAS software from the company Brüker.

Example 1

Synthesis of HPY with Addition of Nucleating Gel and Growth Gel with a $TPOAC/Al_2O_3$ Ratio=0.04 a) Preparation of the Growth Gel in a Reactor Stirred with an Archimedean Screw at 300 Rpm.

A growth gel is prepared in a three litre stainless-steel reactor equipped with a heating jacket, a temperature probe and a stirrer, by adding 1446 g of colloidal silica (Ludox AM-30 containing 30% by weight of $SiO_2$) at 25° C. to a solution of aluminate containing 184 g of sodium hydroxide (NaOH), 138 g of alumina trihydrate ($Al_2O_3·3H_2O$, containing 65.2% by weight of $Al_2O_3$) and 800 g of water at 25° C. for 25 minutes with a stirring speed of 300 rpm.

The stoichiometry of the growth gel is as follows: 2.5 $Na_2O/Al_2O_3/8.0\ SiO_2/117\ H_2O$. The homogenization of the growth gel is performed with stirring at 300 rpm, for 25 minutes, at 25° C.

b) Addition of the Nucleating Gel 61.2 g of nucleating gel (i.e. 2% by weight) of composition 12 $Na_2O/Al_2O_3/10\ SiO_2/180\ H_2O$ prepared by mixing a sodium silicate with a sodium aluminate with stirring for one hour at 40° C., is added to the growth gel, at 25° C. with stirring at 300 rpm. After 5 minutes of homogenization at 300 rpm, the stirring speed is reduced to 100 rpm and stirring is continued for 30 minutes.

c) Introduction of the Structuring Agent into the Reaction Medium 27.3 g of a solution of TPOAC at 60% in methanol (MeOH) is introduced into the reaction medium with a stirring speed of 300 rpm ($TPOAC/Al_2O_3$ mole ratio=0.04). A maturation step is performed at 25° C. for one hour at 300 rpm before starting the crystallization.

d) Crystallization

The stirring speed is lowered to 50 rpm and the nominal temperature of the reactor jacket is set at 80° C. in order for the temperature of the reaction medium to rise to 75° C. over 80 minutes. After 22 hours at a steady stage of 75° C., the reaction medium is cooled by circulating cold water in the jacket to stop the crystallization.

e) Filtration/Washing

The solids are recovered on a sinter and then washed with deionized water to neutral pH.

f) Drying/Calcination

In order to characterize the product, drying is performed in an oven at 90° C. for 8 hours, the loss on ignition of the dried product being 23% by weight.

The calcination of the dried product required to release both the microporosity (water) and the mesoporosity by removing the structuring agent is performed with the following temperature profile: 30 minutes of temperature increase to 200° C., then 1 hour at a steady stage of 200° C., then 3 hours of temperature increase to 550° C., and finally 1.5 hours of steady stage at 550° C.

A pure mesoporous zeolite Y (identification by X-ray diffraction spectrum), with an Si/Al atomic ratio determined by X-ray fluorescence equal to 2.6 and with a micropore volume equal to 0.330 $cm^3·g^{-1}$ is thus obtained.

Example 2

Synthesis of HPY with Addition of Nucleating Gel and Growth Gel with a $TPOAC/Al_2O_3$ Ratio=0.02

The process is performed as in Example 1, with a $TPOAC/Al_2O_3$ mole ratio of 0.02. A pure mesoporous zeolite Y (XRD), with an Si/Al atomic ratio determined by X-ray fluorescence equal to 2.6 and with a micropore volume equal to 0.332 $cm^3·g^{-1}$ is thus obtained.

Example 3

Synthesis of HPY with Addition of Nucleating Gel and Growth Gel with a $TPOAC/Al_2O_3$ Ratio=0.08

The process is performed as described in Example 1, with a $TPOAC/Al_2O_3$ mole ratio of 0.08. A pure mesoporous zeolite Y (XRD), with an Si/Al atomic ratio determined by X-ray fluorescence equal to 2.6 and with a micropore volume equal to 0.320 $cm^3·g^{-1}$ is thus obtained.

Example 4

Synthesis of HPY from a Growth Gel Prepared with a Shear Mixer with Addition of Nucleating Gel and a $TPOAC/Al_2O_3$ Ratio=0.06.

a) Preparation of the Growth Gel with a Deflocculating Disc (Shear Mixer).

The growth gel is prepared in a 3-litre reactor by adding 1136 g of colloidal silica (Ludox AM-30 containing 30% by weight of $SiO_2$) at 25° C. in a solution of aluminate containing 145 g of sodium hydroxide (NaOH), 111 g of alumina trihydrate ($Al_2O_3 \cdot 3H_2O$, containing 65.2% by weight of $Al_2O_3$) and 626 g of water at 25° C. for 3 minutes with a stirring speed of 2500 rpm.

The stoichiometry of the growth gel is as follows: 2.5 $Na_2O/Al_2O_3/8.0\ SiO_2/117\ H_2O$. The homogenization of the growth gel is performed with stirring at 1200 rpm, for 5 minutes, at 25° C.

In order to carry out the crystallisation, the growth gel is transferred into a 3-litre reactor stirred with an Archimedean screw.

b) Addition of the Nucleating Gel 101 g of nucleating gel (i.e. 5% by weight) of composition 12 $Na_2O/Al_2O_3/10\ SiO_2/180\ H_2O$ having matured for 1 hour at 40° C., is added to the growth gel, at 25° C. with stirring at 300 rpm. After 5 minutes of homogenization at 300 rpm, the stirring speed is reduced to 100 rpm and stirring is continued for 30 minutes.

c) Introduction of the Structuring Agent into the Reaction Medium 35.2 g of a solution of TPOAC at 60% in methanol (MeOH) is introduced into the reaction medium with a stirring speed of 300 rpm (TPOAC/$Al_2O_3$ mole ratio=0.06). A maturation step is performed at 25° C. for 1 hour at 300 rpm before starting the crystallization.

d) Maturation and Crystallization

A maturation step is performed at 25° C. and at 100 rpm for 10 hours.

The stirring speed is maintained at 100 rpm and a temperature increase to 95° C. is performed over 2 hours. After a steady stage of 36 hours at 95° C., the reaction medium is cooled by circulating cold water in the jacket to stop the crystallization.

e) Filtration/Washing

The solids are recovered on a sinter and then washed with deionized water to neutral pH.

f) Drying/Calcination

In order to characterize the product, drying is performed in an oven at 90° C. for 8 hours, the loss on ignition of the dried product being 22% by weight.

The calcination of the dried product required to release both the microporosity (water) and the mesoporosity by removing the structuring agent is performed with the following temperature profile: 30 minutes of temperature increase to 200° C., then 1 hour at a steady stage of 200° C., then 3 hours of temperature increase to 550° C., and finally 1.5 hours of steady stage at 550° C.

327 g of anhydrous zeolite HPY equivalent solid are thus obtained; which represents a yield of 97 mol % relative to the amount of aluminium engaged. The Si/Al ratio of the HPY determined by X-ray fluorescence is equal to 2.4.

The porosity characteristics (micropore volume, mesoporous outer surface area, size of the mesopores) are collated in Table 1.

Figure 2:
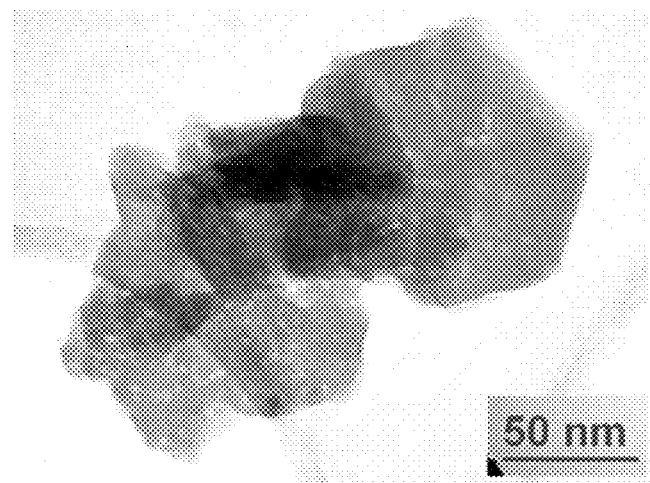

The morphology of the crystals is presented in FIG. 1 (SEM photo, ×5000 magnification) and the mesoporosity is visualized in FIG. 2 (TEM photo, ×300 000 magnification). The size of the crystals is between 3 μm and 7 μm.

Example 5

Synthesis of HPY from a a Growth Gel Prepared with a Shear Mixer with Addition of Nucleating Gel and a TPOAC/$Al_2O_3$ Ratio=0.06.

The process is performed as described in Example 4, with addition of 10% by weight of the same nucleating gel relative to the weight of the growth gel so as to reduce the size of the crystals.

The zeolite obtained has a crystal size of between 1 μm and 3 μm, i.e. smaller than the size of the zeolite crystals obtained in Example 4.

Comparison of the Characteristics of the Hierarchically Porous Zeolite Y Powders Synthesized in Examples 1, 2, 3 and 4

The results of the characterizations of the hierarchically porous zeolites are collated in Table 1 with a comparison with a reference zeolite Y, CBV 100, sold by Zeolyst International, and for which the mean size of the crystals is 0.6 μm.

The porosity characteristics (micropore volume, mesopore outer surface area, mesopore size) are calculated from the nitrogen adsorption/desorption isotherms at the temperature of liquid nitrogen for a powder degassed beforehand at 300° C. under vacuum. The measurements are taken on an ASAP 2020 machine from Micromeritics.

The micropore volume ($cm^3 \cdot g^{-1}$) is calculated according to the Dubinin-Raduskevitch theory. The mesopore outer surface area ($m^2 \cdot g^{-1}$) is calculated using the t-plot model. The mesopore size distribution is calculated via the Density Functional Theory (DFT) method with the cylindrical pore model.

X-ray diffraction makes it possible to identify the crystal phases present in the powder from the reference spectra (or diffractograms) of the various zeolite structures and to demonstrate the level of crystallinity of the solids produced as a function of the peak intensity.

Figure 3:
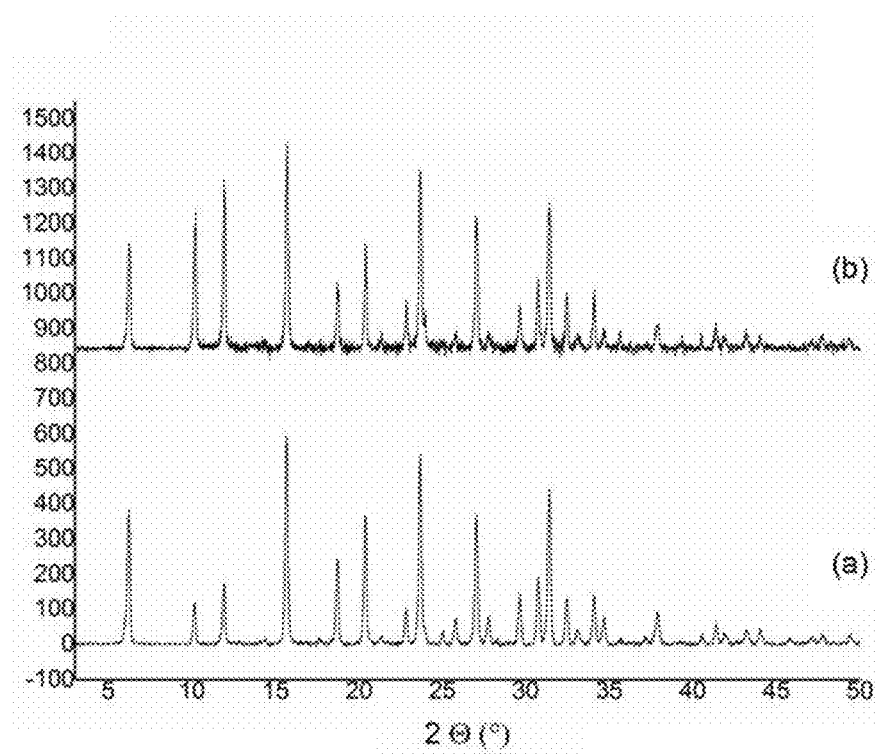
FIG. 3 shows diffractograms of certain zeolites, including the zeolite HPY from Example 4.

FIG. 3 shows the diffractogram (a) of the reference non-mesoporous zeolite Y (CBV 100) and the diffractogram (b) of the zeolite HPY from Example 4. This comparison highlights the similarity of the intensities of the diffraction peaks between the reference zeolite and the zeolite of the invention (Example 4). This shows that the crystallinity (and therefore the micropore volume) is similar in these two zeolites.

The results of the characterizations of the hierarchically porous zeolites (HPY) of Examples 1, 2, 3 and 4 are collated in Table 1 below:

TABLE 1

| Products | Synthesis | | Nitrogen adsorption isotherm at 77K | | | XRD spectrum Crystal phase |
|---|---|---|---|---|---|---|
| | TPOAC/$Al_2O_3$ ratio | Synthesis time (h) | Vμp ($cm^3 \cdot g^{-1}$) | Mesop. outer S ($m^2 \cdot g^{-1}$) | Mesopore size (nm) | |
| Zeolite Y CBV100 | 0 | — | 0.328 | 20 | — | Pure FAU |
| HPY Example 1 | 0.04 | 26 | 0.330 | 100 | 5 to 10 | Pure FAU |

TABLE 1-continued

| | Synthesis | | Nitrogen adsorption isotherm at 77K | | | XRD |
|---|---|---|---|---|---|---|
| Products | TPOAC/Al$_2$O$_3$ ratio | Synthesis time (h) | Vµp (cm$^3$·g$^{-1}$) | Mesop. outer S (m$^2$·g$^{-1}$) | Mesopore size (nm) | spectrum Crystal phase |
| HPY Example 2 | 0.02 | 20 | 0.332 | 80 | 5 to 10 | Pure FAU |
| HPY Example 3 | 0.08 | 40 | 0.320 | 140 | 5 to 10 | Pure FAU |
| HPY Example 4 | 0.06 | 50 | 0.320 | 102 | 5 to 10 | Pure FAU |

Key:

Zeolite Y CBV 100: reference non-mesoporous zeolite from Zeolyst International.

Vµp: micropore volume calculated with the Dubinin-Raduskevitch equation.

outer S: outer surface area deduced from the t-plot extrapolation.

The results presented in Table 1 above show that the morphology of the crystals varies with the TPOAC content. An explanation is the effect of the structuring agent on the growth rates of the various crystal faces.

The synthetic process performed with the use of a seeding gel and a nucleating gel makes it possible to vary the micropore volume/mesopore surface area distribution, while at the same time obtaining a pure FAU (Faujasite) zeolite of Y type, i.e. without observing other crystal forms.

The process described in the present invention is economically viable, simple to perform industrially, with a very substantial saving in time when compared with the syntheses described in the prior art. In addition, the synthetic process of the invention makes it possible to achieve entirely satisfactory yields, generally greater than 90% relative to the amount of aluminium engaged, which is the element in deficit in the synthesis gel.

What is claimed:

1. A hierarchically porous zeolite having at least the following characteristics:
   Si/Al atomic ratio greater than 1.3 and less than 3, limits inclusive
   micropore volume Vµp, in cm$^3$·g$^{-1}$, which satisfies the equation Vµp=Vµp$_R$±15%, where Vµp$_R$ represents the micropore volume, in cm$^3$·g$^{-1}$, measured under the same conditions, for a zeolite of the same chemical nature and of the same crystalline structure, but the mesoporous outer surface area of which is less than 40 m$^2$·g$^{-1}$, and
   mesoporosity such that the mesoporous outer surface area is between 40 m$^2$·g$^{-1}$ and 400 m$^2$·g$^{-1}$.

2. The hierarchically porous zeolite according to claim 1, wherein the zeolite is a Faujasite zeolite.

3. The hierarchically porous zeolite according to claim 1 having a numerical mean diameter of the crystals of between 0.1 µm and 20 µm, limits inclusive.

4. The hierarchically porous zeolite according to claim 1, comprising a pure zeolite phase.

5. The hierarchically porous zeolite according to claim 1, having a micropore volume Vµp which satisfies the equation Vµp=Vµp$_R$±10%, where Vµp$_R$ represents the micropore volume measured, under the same conditions, for a zeolite of the same chemical nature and of the same crystal structure, which is perfectly crystalline but having a mesopore outer surface area which is less than 40 m$^2$·g$^{-1}$.

6. The hierarchically porous zeolite according to claim 1, wherein the mesoporous outer surface area is between 60 m$^2$·g$^{-1}$ and 150 m$^2$·g$^{-1}$.

7. The hierarchically porous zeolite according to claim 1, wherein the hierarchically porous zeolite is a Faujasite zeolite of Y type.

8. The hierarchically porous zeolite according to claim 1, having a numerical mean diameter of the crystals of between 0.5 µm and 5 µm, limits inclusive.

9. The hierarchically porous zeolite according to claim 1, consisting of a single zeolite phase.

10. The hierarchically porous zeolite according to claim 1, having a micropore volume Vµp which satisfies the equation Vµp=Vµp$_R$±3%, where Vµp$_R$ represents the micropore volume measured, under the same conditions, for a zeolite of the same chemical nature and of the same crystal structure, which is perfectly crystalline but having a mesopore outer surface area which is less than 40 m$^2$·g$^{-1}$.

* * * * *